US012811969B2

(12) United States Patent
Desarkar et al.

(10) Patent No.: US 12,811,969 B2
(45) Date of Patent: Nov. 24, 2026

(54) METHOD AND SYSTEM FOR DETECTING ANOMALIES IN A STRUCTURED DATASET USING CONTEXTUAL VECTOR EMBEDDING

(71) Applicant: LTI Mindtree Ltd, Mumbai (IN)

(72) Inventors: Anindita Desarkar, Uttar Purba Fartabad (IN); Aritra Sen, Hatiara (IN); Vishwanathan Raman, Nanganallur (IN)

(73) Assignee: LTI Mindtree Ltd., Mumbai (IN)

( * ) Notice: Subject to any disclaimer, the term of this patent is extended or adjusted under 35 U.S.C. 154(b) by 0 days.

(21) Appl. No.: 18/967,706

(22) Filed: Dec. 4, 2024

(65) Prior Publication Data

US 2026/0106882 A1 Apr. 16, 2026

(30) Foreign Application Priority Data

Oct. 15, 2024 (IN) ............................ 202421078252

(51) Int. Cl.

| | |
|---|---|
| ***G06F 21/00*** | (2013.01) |
| ***G06F 16/334*** | (2025.01) |
| ***G06F 16/35*** | (2019.01) |
| ***G06F 16/383*** | (2019.01) |
| ***H04L 9/40*** | (2022.01) |

(52) U.S. Cl.

CPC ...... *H04L 63/1425* (2013.01); *G06F 16/3347* (2019.01); *G06F 16/35* (2019.01); *G06F 16/383* (2019.01)

(58) Field of Classification Search

CPC . H04L 63/1425; G06F 16/3347; G06F 16/35; G06F 16/383; G06F 16/2365; G06F 16/285; G06F 16/24568

See application file for complete search history.

(56) References Cited

U.S. PATENT DOCUMENTS

| | | | | |
|---|---|---|---|---|
| 2017/0124478 | A1* | 5/2017 | Baradaran | H04L 41/16 |
| 2018/0189128 | A1* | 7/2018 | Qiao | G06N 20/20 |
| 2023/0291633 | A1* | 9/2023 | Gao | H04L 27/363 |
| 2024/0146747 | A1* | 5/2024 | Zaytsev | H04L 63/1416 |
| 2025/0103966 | A1* | 3/2025 | Beauchesne | G06N 20/00 |
| 2025/0378453 | A1* | 12/2025 | Myers | G06F 16/345 |
| 2025/0390477 | A1* | 12/2025 | Myers | G06F 16/215 |
| 2025/0390498 | A1* | 12/2025 | Turrell | G06F 16/24556 |

* cited by examiner

*Primary Examiner* — William A Corum, Jr.
(74) *Attorney, Agent, or Firm* — CHIP LAW GROUP

(57) ABSTRACT

A method and system for detecting anomalies in a structured dataset. An input interface receive an input dataset including a plurality of features for each data point across columns of the input dataset. The input dataset may include either labelled data or unlabeled data. A combining module combines the plurality of features to create a single column that contains a combined string of respective features of that data point. A transformation module transforms each combined string in the single column to an embedding vector by employing contextualized vector technique. The embedding captures interactions among the plurality of features in the respective data point. Anomaly detection module detects anomalies in the structured dataset by applying at least one of a supervised approach or an unsupervised approach to the embedding vector in the vector space.

18 Claims, 6 Drawing Sheets

METHOD AND SYSTEM FOR DETECTING ANOMALIES IN A STRUCTURED DATASET USING CONTEXTUAL VECTOR EMBEDDING

CROSS-REFERENCE TO PRIOR APPLICATION

This application claims the benefit of and priority to Indian Patent Application number 202421078252, filed on Oct. 15, 2024, which is hereby incorporated herein by reference in its entirety.

The entire contents of the priority application, including any appendices, exhibits, and amendments filed therewith, are hereby incorporated by reference in its entirety.

FIELD

Various embodiments of the present disclosure generally relate to anomaly detection. More particularly, the disclosure relates to a method and system for detecting structural inconsistencies and anomalies based on embedding analysis in a structured dataset and determining insights for outliers using explainable Artificial Intelligence (XAI).

BACKGROUND

Anomaly det detection plays a vital role in diverse industries such as finance, security, and healthcare, where identifying outliers or irregular patterns is crucial for preventing significant risks and losses. While standard machine learning algorithms have advanced, achieving the desired accuracy in anomaly detection remains a significant challenge. These methods often encounter difficulties arising from data complexity, dynamic environments, imbalanced datasets, interpretability issues, and scalability limitations.

Standard machine learning algorithms for anomaly detection are well-established. These algorithms can be broadly categorized based on the dimensionality of the datasets they handle: one-dimensional feature techniques and multi-dimensional feature techniques. One-dimensional techniques are designed for datasets with a single feature and utilize statistical approaches to identify outliers by analyzing deviations from a central tendency. In contrast, multi-dimensional techniques are suitable for datasets with multiple features, employing a variety of algorithms to capture the complexities inherent in high-dimensional spaces.

Although standard machine learning techniques provide a basis for anomaly detection, they often exhibit limitations in complex, real-world applications. These limitations include inconsistent prediction accuracy, information loss, difficulty in identifying significant features, challenges in handling categorical data, and an inadequate ability to capture feature interactions. These shortcomings can result in missed anomalies, particularly those arising from complex relationships between variables, thereby reducing the overall effectiveness of anomaly detection.

Existing anomaly detection techniques often fall short of providing optimal solutions. Their reliance on similarity checking limits the ability to capture complex patterns and relationships within data. Furthermore, because they lack machine learning models, these approaches may struggle to adapt to dynamic environments or learn from historical data. This static nature can lead to missed anomalies that require deeper analysis and contextual understanding.

Existing solutions often focus narrowly on user agent analysis, which may limit their generalizability to diverse datasets. While the use of a probability distribution function can simplify anomaly detection, it may overlook critical features or interactions present in more complex datasets. This reliance on simplification can restrict versatility and applicability to broader contexts and different data types.

Although existing solutions may leverage semantic similarity to identify related items, this approach may not effectively detect anomalies that deviate from established patterns. These methods often fail to consider other essential factors, such as temporal dynamics or numerical anomalies, potentially leading to an increase in false negatives. This lack of comprehensive analysis can limit their effectiveness across varied unstructured datasets.

Some existing solutions employ highly specialized approaches, such as semi-supervised methods utilizing Generative Adversarial Networks (GAN) models. However, these solutions often have limited applicability across multiple domains. While GANs can generate synthetic data to improve anomaly detection, their reliance on semi-supervised learning means their performance depends heavily on the quality and quantity of labeled data, which may not always be available.

While graph-based methods can effectively capture relationships and interactions between entities, they can be computationally intensive and may face scalability challenges. Furthermore, these methods often require prior knowledge of the graph structure, which can hinder their adaptability to evolving datasets and dynamic relationships, potentially leading to oversights in anomaly detection.

In addition, anomaly detection methods based solely on log analysis may have limited effectiveness when applied to structured data. Structured data often contains more explicit relationships and patterns that log analysis may not fully capture. Furthermore, relying exclusively on predefined rules or thresholds within log analysis can lead to inefficiencies in processing time and resource allocation, as opposed to leveraging more adaptive learning techniques.

Anomaly detection methods that rely solely on basic similarity search without incorporating machine learning may miss anomalies that require deeper analysis and contextual understanding. This simplistic approach can also lead to high false positive rates and decreased robustness, particularly in complex environments.

Anomaly detection solutions specifically designed for cybersecurity may have limited applicability in other critical areas, such as finance or healthcare, potentially missing valuable opportunities for broader anomaly detection. Moreover, relying solely on similarity search can restrict the ability to learn from historical data and adapt to new threats, reducing effectiveness in dynamic environments.

SUMMARY

A system and a method for detecting anomalies in a structured dataset is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout

DETAILED DESCRIPTION

Figure 1:
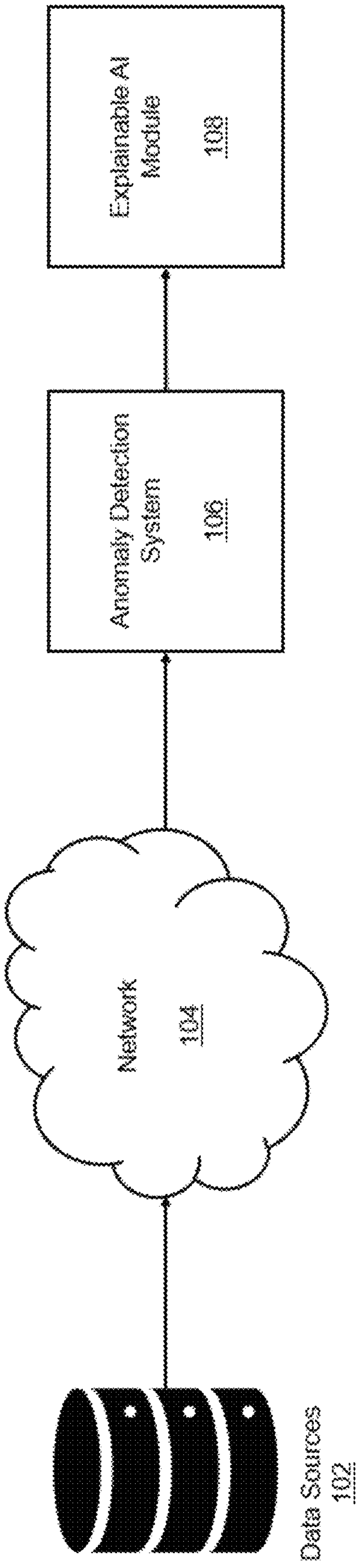
FIG. 1 is a diagram that illustrates an exemplary environment within which various embodiments of the present disclosure may function.

Various embodiments of the present disclosure relate to a method and a system for detecting anomalies in the structured dataset. An input interface is configured to receive an input dataset comprising a plurality of features. The input dataset received by the input interface can include either labelled data or unlabeled data. The system is also configured to generate synthetic data upon determining the presence of inadequate data patterns in the input dataset that is received.

Anomalies in the labelled data of the input dataset are detected by leveraging a supervised approach that utilizes a Majority Voting Technique. Anomalies in the unlabeled data of the input dataset are detected by leveraging an unsupervised approach that utilizes Local Outlier Factor (LOF), and clustering techniques. A combining module combines the plurality of features for each data point across all columns of the input dataset to create a single column. Each entry in a single column contains a combined string of respective features of that data point. A transformation module transforms each combined string in the single column to an embedding vector by employing contextualized vector technique. The embedding captures interactions among the plurality of features in the respective data point. An anomaly detection module detects the anomalies in the structured dataset by applying at least one of a supervised approach or an unsupervised approach to the embedding vector in the vector space.

The system is also configured to leverage one or more XAI techniques to explain root causes of the detected anomalies to derive insights from them and provide actionable recommendations to users.

In one or more embodiments, anomalies or structural inconsistencies within datasets refer to deviations from expected patterns or formats that may indicate errors or irregularities. Structural inconsistencies can manifest as missing values, unexpected data types, or logical contradictions within the dataset's schema. Anomalies may arise from various sources, including data entry errors, sensor malfunctions, or integration issues across disparate data systems.

In one or more embodiments, the structured dataset refers to a collection of data that is organized in a predefined format, typically consisting of rows and columns, akin to a table in a relational database. Each column represents a specific attribute or feature, while each row corresponds to a single record or a datapoint, facilitating easy access and analysis of the data.

In one or more embodiments, the plurality of features refers to the multiple attributes or characteristics that comprise the input dataset. Each feature represents a distinct variable that contributes to the overall dataset, capturing different dimensions of the data being analyzed. For instance, in a dataset pertaining to customer behavior, features could include demographic information (age, gender), transaction history (purchase amounts, frequency), and engagement metrics (website visits, time spent).

In one or more embodiments, the labelled data refers to datasets in which each entry is accompanied by a corresponding label or target variable that indicates the expected outcome or category for that data point. The unlabeled data refers to datasets that do not have associated labels, indicating that the entries lack explicit classifications or outcomes. This type of data is common in real-world applications where obtaining labels is challenging or expensive.

FIG. 1 is a diagram that illustrates an exemplary environment 100 within which various embodiments of the present disclosure may function. Referring to FIG. 1, the environment 100 comprises one or more data sources 102, a network 104, a system 106, and an explainable AI (XAI) module 108.

The one or more data sources 102 refer to various domains from which data is collected and utilized by the system 106. The data sources can encompass a wide range of data-generating entities, each contributing unique information critical for comprehensive analysis. The one or more data sources 102 can include dataset from domains such as, but not limited to, healthcare, retail, agriculture, environmental monitoring, education, manufacturing, transportation and logistics, finance, and security.

In one or more embodiments, the one or more data sources 102 disclosed in the present disclosure are merely illustrative examples and should not be construed as limiting the scope of potential data sources.

In one or more embodiments, the datasets generated by the one or more data sources 102 may include either labelled data or unlabeled data. The labelled data refers to datasets in which each entry is accompanied by a corresponding label or target variable that indicates the expected outcome or category for that data point. The unlabeled data refers to datasets that do not have associated labels, indicating that the entries lack explicit classifications or outcomes.

The network 104 includes communication networks operable to facilitate communication, either wirelessly or wired. The network 104 connects a plurality of computer systems. The network 104 may comprise, for example, an intranet, local area network, wide area network, the internet, public switched telephone network (PSTN), network of networks, or other network. The plurality of computer systems on the network 104 may transmit and receive data with other computer systems.

The system 106 is connected to the one or more data sources 102 via the network 104. The system 106 receives datasets from the one or more data sources 102 that may comprise different types of data such as, labelled data and unlabeled data.

The XAI module 108 may comprise suitable logic, and/or interfaces, that may be configured to explain root causes of anomalies detected by the system 106.

In one or more embodiments, the XAI module 108 may employ one or more XAI techniques to generate the insights that are beyond merely explaining the root cause, by providing actionable insights that can inform future decision-making, process improvements, and risk mitigation strategies.

Figure 2:
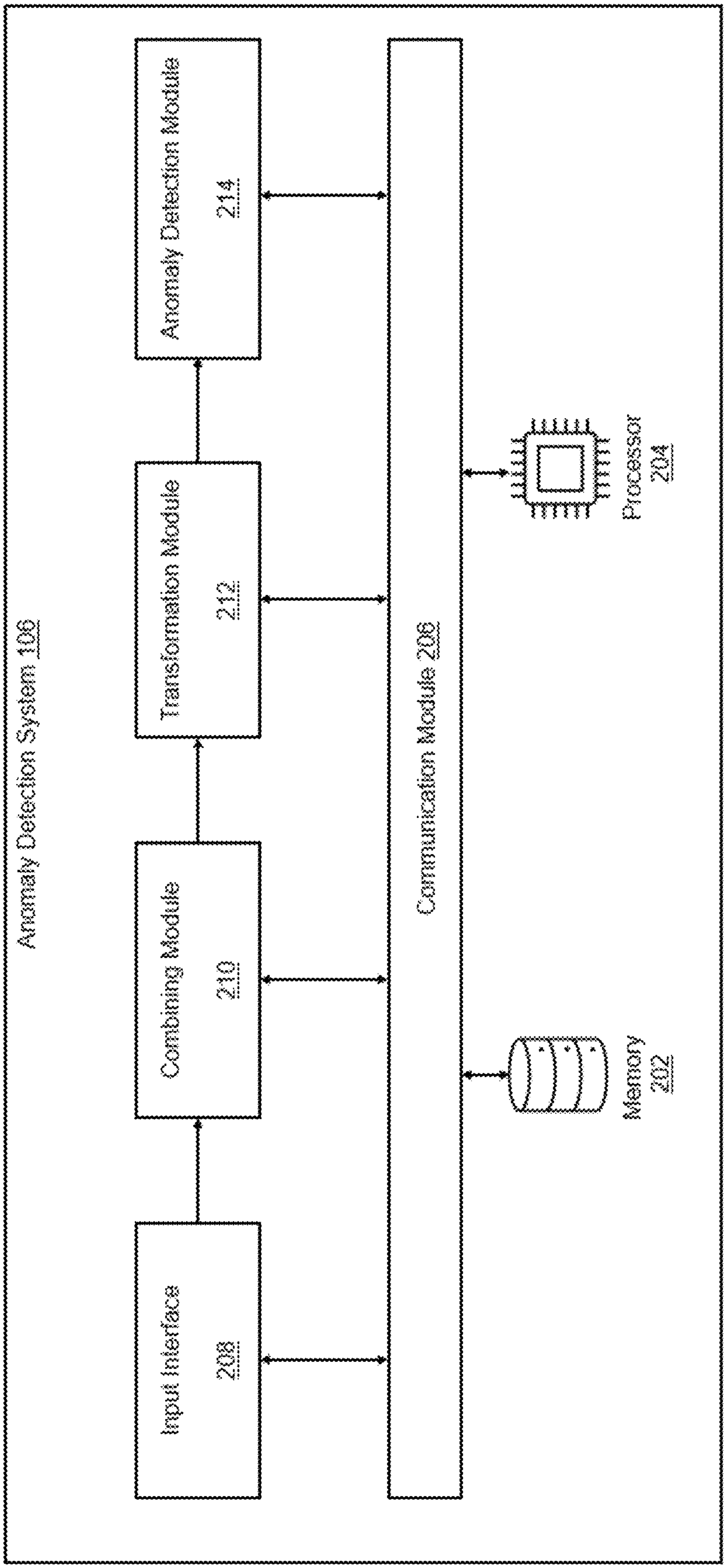
FIG. 2 is a diagram that illustrates a system for detecting anomalies in a structured dataset, in accordance with an embodiment of the disclosure.

FIG. 2 is a diagram that illustrates the system 106 for detecting anomalies in a structured dataset, in accordance with an embodiment of the disclosure. Referring to FIG. 2, the system 106 comprises a memory 202, a processor 204, a communication module 206, an input interface 208, a combining module 210, a transformation module 212, and an anomaly detection module 214.

The memory 202 may comprise suitable logic, and/or interfaces, that may be configured to store instructions (for example, computer-readable program code) that can implement various aspects of the present disclosure.

The processor 204 may comprise suitable logic, interfaces, and/or code that may be configured to execute the instructions stored in the memory 202 to implement various functionalities of the system 106 in accordance with various aspects of the present disclosure. The processor 204 may be further configured to communicate with various modules of the system 106 via the communication module 206.

The communication module 206 may comprise suitable logic, interfaces, and/or code that may be configured to transmit data between modules, engines, databases, memories, and other components of the system 106 for use in performing functions discussed herein. The communication module 206 may include one or more communication types and utilizes various communication methods for communication within the system 106.

The input interface 208 may comprise suitable logic, and/or interfaces, that may be configured to receive the input dataset comprising the plurality of features. The input interface 208 facilitates seamless interaction between the users and the anomaly detection processes. The input interface 208 is also configured to receive various types of input datasets, whether they are labeled or unlabeled, thereby ensuring usability across different applications.

In an exemplary embodiment, the input interface 208 allows the users to easily upload or connect to datasets comprising multiple features. This may include support for different data formats such as, for example, CSV, Excel, etc. The input interface 208 may provide drag-and-drop functionality or file browsing capabilities, making it intuitive for the users to load their data.

In an exemplary embodiment, the input interface 208 can take different forms, each designed to meet specific user needs and contexts such as, but not limited to, a graphical user interface, a command-line interface, touch user interface, voice user interface, natural language user interface, and web user interface.

In one or more embodiments, the plurality of features refers to the multiple attributes or characteristics that comprise the input dataset. Each feature represents a distinct variable that contributes to the overall dataset, capturing different dimensions of the data being analyzed.

The plurality of features received by the input interface 208 may correspond to each data point across all columns of the input dataset. Each feature of the plurality of features represents an individual attribute or variable of the data. In a tabular dataset, the plurality of features are represented as columns, and each row corresponds to a single data point or record. For instance, the input interface 208 captures all relevant data points (rows) for every feature (column) in the input dataset.

In one or more embodiments, the input data received by the input interface 208 may include either labelled data or unlabeled data. The labelled data refers to datasets in which each entry is accompanied by a corresponding label or target variable that indicates the expected outcome or category for that data point. The unlabeled data refers to datasets that do not have associated labels, indicating that the entries lack explicit classifications or outcomes.

In one or more embodiments, the system 106 generates synthetic data upon determining the presence of inadequate data patterns in the input dataset that is received. The synthetic data that is generated mimics the characteristics of the original data and fills in the missing patterns.

In one or more embodiments, the system 106 generates the synthetic data in scenarios such as, but not limited to, data augmentation, privacy preservation, and balancing dataset.

In data augmentation scenario, the system 106 expands small datasets, allowing for getting more relevant data.

In certain scenarios of privacy preservation, real data cannot be utilized for security purposes. In that case, by generating synthetic data, the system 106 performs anomaly detection procedures without exposing the sensitive information.

In scenarios of balancing dataset, the system 106 creates additional samples for underrepresented classes, addressing the common problem of imbalanced data.

In an exemplary embodiment, a user can specify the number of records that needs to be generated, providing a degree of control over how much synthetic data is created. The feature ensures that the synthetic data volume matches the requirements. Specifically, the user can input both a minimum and maximum number of records to be generated, enabling the system 106 to generate an appropriate amount of data that aligns with the specified range. Upon receiving the range definition, the system 106 dynamically determines the exact number of synthetic records to create based on the characteristics of the input data, ensuring that the amount of synthetic data falls within the provided range. For instance, if the user specifies a range between 500 and 1,000 synthetic records, the system 106 will analyze the inadequacies in the original dataset and autonomously generate a number of records within that specified range, depending on the extent of missing data.

Once the synthetic data is generated, the system 106 verifies that the created data adheres to the input pattern using a validation mechanism. The validation mechanism ensures that the generated synthetic data is consistent with the characteristics of the original dataset, maintaining its reliability for further analysis or anomaly detection processes.

In an exemplary embodiment, in a supervised machine learning scenario, the labeled data could be a collection of images of handwritten digits, where each image is accompanied by a label identifying the digit (e.g., 0-9). The system 106 may process the labeled data using a model that leverages these target variables to learn the relationships between the features (e.g., pixel values of the images) and their corresponding labels (e.g., digit classification). Once trained, the model can predict the labels for new, unseen data points.

In another exemplary embodiment, in an unsupervised learning scenario, the unlabeled data could be a set of customer transaction records without any indication of customer segments. The system 106 may utilize unsupervised learning techniques, such as clustering algorithms, to identify inherent patterns or groupings within the data, allowing for the discovery of relationships or structures that were previously unknown.

The combining module 210 may comprise suitable logic, interfaces, and/or code that may be configured to combine the plurality of features for each data point across all columns of the input dataset to create a single column where each entry in the single column contains a combined string of respective features of that data point. As a result, the plurality of features represented in separate columns are combined and represented in a unified format within one column.

In some non-limiting embodiments, the combining module 210 may initially access the input dataset and parse each data point. For each row in the dataset, it retrieves the feature values from multiple columns. The combining module 210 may then apply a combination operation to combine the feature values into a single string. For instance, if the values for a row are 30 (age), male (gender), and 50000 (income), the combined results could be: ("30, Male, 50000").

Thereafter, the combining module 210 places the resulting string in a new single column within the dataset. The process is repeated for each data point (or row) in the input dataset, thus creating a new column where each entry corresponds to the combined features of the data point.

In an exemplary embodiment, the combining module 210 retrieves the feature values from multiple columns and applies a concatenation operation to combine the feature values into a single string as shown in the Table below.

Snapshot of the Result Set-Combined Module

TABLE

| Sector score | PARA_A | Score_A | Risk_A | Concatenated | Embedding_Val |
|---|---|---|---|---|---|
| 1.85 | 7.02 | 0.6 | 4.212 | 1.85 7.02 0.6 4.212 1 | [0.004698810167610645, 0.008417293429374695, 0.01076331827789545, −0.021999897435307503, 0.025353292003273964] |
| 1.85 | 4.99 | 0.6 | 2.994 | 1.85 4.99 0.6 2.994 0 | [−0.01609579473733902, 0.0034900587052106857, 0.008232451975345612, −0.016372626647353172, −0.010671209543943405] |
| 55.57 | 0.07 | 0.2 | 0.014 | 55.57 0.07 0.2 0.014 | [−0.02188892848789692, 0.0169218759983778, −0.0048986091278493404, −0.01597018353641033, −0.003591661574319005] |
| 3.89 | 0.74 | 0.2 | 0.148 | 3.89 0.74 0.2 0.148 1 | [−0.015079558826982975, −0.004088752903044224, 0.017378028482198715, −0.027794217690825462, −0.014906841330230236] |
| 3.89 | 1.26 | 0.4 | 0.504 | 3.89 1.26 0.4 0.504 0 | [−0.015500719659030437, 0.01076185330748558, 0.012111159041523933, −0.018577396869659424, −0.00473886588588357] |
| 55.57 | 0 | 0.2 | 0 | 55.570.00.20.012 | [−0.012670636177062988, 0.004440364427864515, 0.016964979469776154, −0.0029519463423639536, −0.007725835777819157] |
| 1.85 | 0.18 | 0.2 | 0.036 | 1.85 0.18 0.2 0.036 0 | [−0.01941951923072338, 0.004123322665691376, −0.005337042734026909, −0.011066465638577938, −0.0227314792573452] |
| 3.89 | 0 | 0.2 | 0 | 3.89 0.0 0.2 0.0 0.75 | [−0.01221370231360197, 0.0125235915184021, 0.004048778209835291, −0.020102418959140778, −0.01794666424393654] |

The transformation module 212 may comprise suitable logic, interfaces, and/or code that may be configured to transform each combined string in the single column to an embedding vector by employing contextualized vector embedding technique.

In one or more embodiments, the contextualized vector embedding technique refers to a method used to represent data points in a continuous, dense vector space where similar data points (in context) are located closer to each other. These embeddings typically capture more meaningful relationships between features. The transformation module 212 applies such a technique to convert the combined strings into vectors that represent the underlying data in a machine-learning-friendly format.

By considering the entire combined string, the transformation module 212 embeds the data in a way that reflects relationships between different features in the string. For example, a string like "30, Male, 50000" might result in a vector that places more emphasis on age and income in predicting purchasing behavior, while another string might emphasize different aspects depending on the combination of features.

In one or more embodiments, for each combined string in the single column, the transformation module 212 outputs an embedding vector, which is a numerical representation of the input string.

In an exemplary embodiment, the embedding vector generated by the transformation module 212 may typically contain a fixed size (e.g., 128, 256, or 512 dimensions), depending on the embedding technique used. For instance, for an Input: "30, Male, 50000", the Output is: [0.45, −0.22, 0.33, . . . , 0.18], indicating a 128-dimensional vector representation of the combined features.

By employing the contextualized vector embeddings, the transformation module 212 considers the relationships and interactions between the plurality of features when generating the embeddings from respective data points.

The anomaly detection module 214 may comprise suitable logic, interfaces, and/or code that may be configured to detect anomalies in the structured dataset by applying at least one of a supervised approach or an unsupervised approach to the embedding vector in the vector space.

The input to the anomaly detection module 214 consists of embedding vectors. The embedding vectors represent data points in a dense, continuous space, where each vector encapsulates the relationships between the features of a data point. Since the embeddings are compact representations of the original dataset, the anomaly detection module 214 works on the vectorized version of the data to detect outliers or unusual patterns.

In one or more embodiments, the anomaly detection module 214 may employ either a supervised approach or an unsupervised approach to detect anomalies in the structured dataset.

In accordance with the one or more embodiments, when the input data received is determined to be the labelled data, the anomaly detection module 214 employs the supervised approach for detecting the anomalies. Alternatively, when the input data received is determined to be the unlabeled data, the anomaly detection module 214 employs the unsupervised approach for detecting the anomalies.

Anomalies detected by the anomaly detection module 214 represent data points that deviate significantly from the norm. Since the input data has been transformed into embedding vectors, these anomalies can be identified based on their unusual locations or properties in the vector space. For instance, the types of anomalies the anomaly detection module 214 may detect include outliers, contextual anomalies, and collective anomalies.

Figure 3:
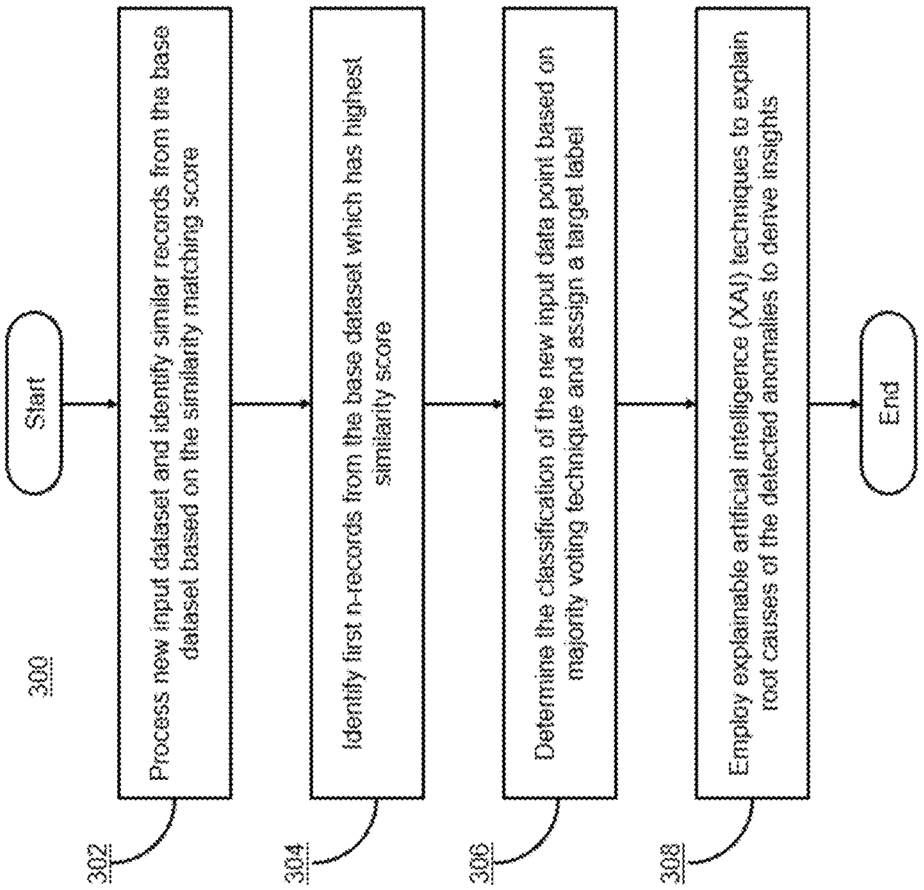
FIG. 3 is a diagram that illustrates a flow chart for a method for detecting anomalies in labelled data by employing supervised majority voting technique, in accordance with an embodiment of the disclosure.

FIG. 3 is a diagram that illustrates a flow chart 300 for a method for detecting anomalies in labelled data by employing supervised majority voting technique, in accordance with an embodiment of the disclosure.

In one or more embodiments, the anomaly detection module 214 employs a supervised approach using a majority voting technique for detecting anomalies in the labelled data, which generates similar records based on a similarity score and assigns a target label to the new input dataset.

At 302, the anomaly detection module 214, by employing the majority voting technique, processes the new input dataset and calculates a similarity score between the new input data point and the existing records in the labeled dataset. The calculated similarity score measures how closely the new data point resembles the previously labeled data points in terms of their features and patterns, The anomaly detection module 214, upon measuring the similarity score, classifies the new data point.

At 304, the anomaly detection module 214 identifies first n-records from the base dataset which has highest similarity score (e.g., the top-k most similar records). These similar records are classified as either normal or anomalous based on their target labels. Each similar record is voted for its label (normal or anomalous). For instance, if there are 10 similar records, and 7 of them are labeled as normal while 3 are labeled as anomalous, the normal category will have more votes.

The label that receives the majority of votes is assigned to the new input data point. In this case, if 7 out of 10 neighbors are normal, the new data point will also be classified as normal. Conversely, if the majority of the similar records are labeled as anomalous, the new data point will be flagged as an anomaly.

At 306, the anomaly detection module 214, by utilizing the majority voting technique, determines the classification of the new input data point (either normal or anomalous), and assigns a target label to the data point. The assigned label is based on the outcome of the majority vote, ensuring that the new data point is categorized in line with the existing patterns in the labeled data.

In one or more embodiments, if the majority of similar records are classified as normal, the new data point is assigned a normal label, indicating it does not exhibit any significant deviation from the typical behavior. If the majority of similar records are labeled as anomalies, the new data point is flagged as an anomaly indicating significant deviation from the typical behavior.

In one or more embodiments, the majority voting technique based supervised approach generates similar records based on a similarity score and assigns a target label to the new input dataset.

At 308, the system 106, upon detecting the anomaly, employs XAI techniques to explain root causes of the detected anomalies and derive insights. By leveraging the XAI, the system 106 examines the features and patterns in the dataset that contributed most significantly to the anomalies.

In an exemplary embodiment, insights are derived by employing the XAI techniques such as, for example, feature attribution methods, rule-based explanations, and decision path analysis. The insights generated by XAI techniques go beyond simply explaining the root cause by providing actionable insights that can inform future decision-making, process improvements, and risk mitigation strategies. For instance, a few types of insights that the system 106 may provide include patterns in anomalies, feature importance, correlation with external factors, and preventative recommendations.

In one or more embodiments the XAI techniques utilized in the present disclosure build a trustworthy system so that user adoption can be enhanced. The present disclosure utilizes a Z-Score and modified Z Score techniques which check the data distribution of the individual features. The major steps include estimating the mean and standard deviation of each features using normal/good data, measuring Z-score on anomalous data which basically tells how many standard deviations away a data point is from the mean and finally selecting top n features which are the reason behind the data point is labelled as anomaly.

Figure 4:
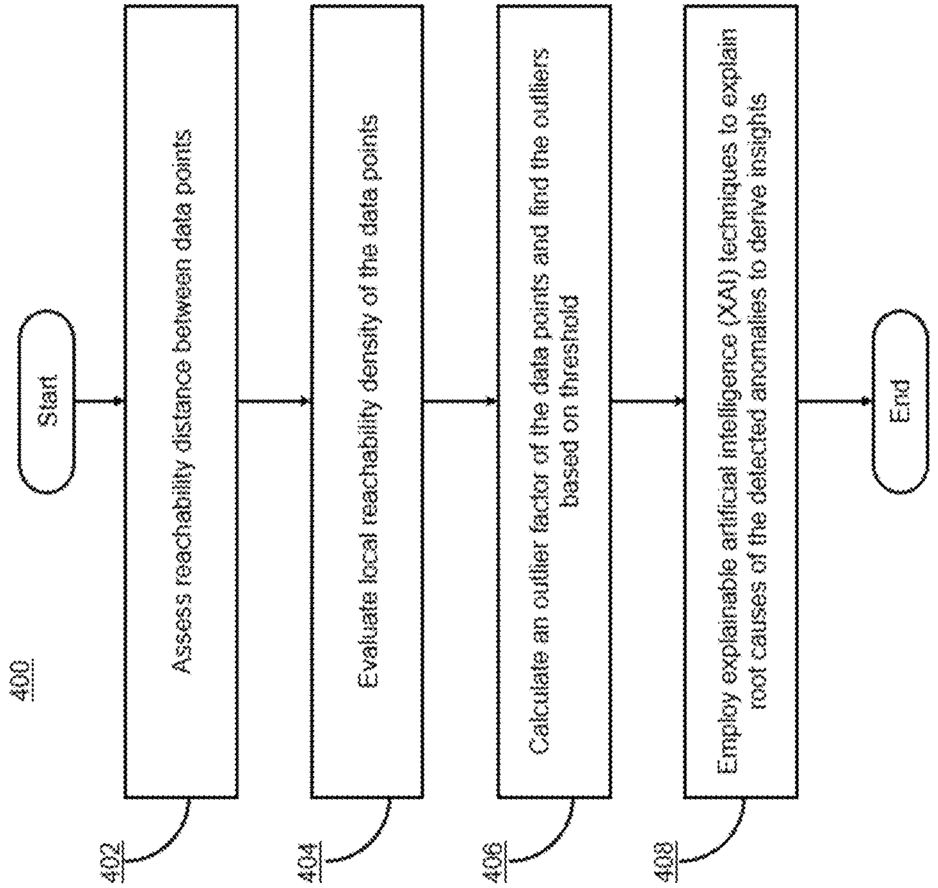
FIG. 4 is a diagram that illustrates a flow chart for a method for detecting anomalies in unlabeled data by employing unsupervised Local Outlier Factor (LOF) technique, in accordance with an embodiment of the disclosure.

FIG. 4 is a diagram that illustrates a flow chart 400 for a method for detecting anomalies in unlabeled data by employing unsupervised Local Outlier Factor (LOF) technique, in accordance with an embodiment of the disclosure.

In one or more embodiments, the anomaly detection module 214 employs an unsupervised approach using the LOF technique for detecting anomalies in the unlabeled data, which assesses reachability distance between data points, evaluates local reachability density of the data points, and calculates an outlier factor of the data points.

At 402, with regards to assessing reachability distance between data points, the LOF technique begins by determining the reachability distance of each data point. The process starts with the identification of the k nearest neighbors, where k is a user-specified parameter that controls the size of the local neighborhood being analyzed. The anomaly detection module 214 calculates the distance between the target data point and each of its k nearest neighbors.

The reachability distance for the data point is then defined as the maximum distance between the data point and any of its k nearest neighbors. This ensures that even if one of the neighboring points is unusually far from the others, the reachability distance captures the outlier behavior. The reachability distance effectively serves as a measure of how far the data point can reach its local neighbors, taking into account both normal and anomalous distances.

At 404, with regards to evaluating local reachability density of the data points, the LOF technique calculated local reachability density of a data point based on its reachability distance. Specifically, by utilizing the LOF technique, the anomaly detection module 214 sums the distances between the target data point and each of its k nearest neighbors and then divides the sum by k. The calculation provides a measure of the local density surrounding the data point.

A higher local reachability density suggests that the data point resides in a densely populated region of the dataset, where nearby points are relatively close to one another. Conversely, a lower local reachability density indicates that the data point is located in a sparse region, potentially signifying that it could be an anomaly. The local reachability density is crucial for determining whether the data point belongs to a typical cluster or is an outlier.

At 406, with regards to calculating the outlier factor of a data point, the anomaly detection module 214 computes the outlier factor for each data point by utilizing the LOF technique and finds outliers based on a threshold value. The outlier factor is a ratio that compares the local reachability density of the data point to the average local reachability density of its k nearest neighbors. If the data point has a low local reachability density (indicating it is in a sparsely populated region) compared to the higher densities of its neighbors, the outlier factor will be high, signaling that the data point is likely an outlier.

Conversely, if the data point has a similar local reachability density to its neighbors, the outlier factor will be low, indicating that the data point is more likely to be normal and not an outlier. A high outlier factor identifies data points that are significantly different from their local neighbors, meaning they are likely to be anomalies.

At 408, the system 106, upon detecting the anomalies, employs XAI techniques to explain root causes of the detected anomalies and derive insights. By leveraging the XAI, the system 106 examines the features and patterns in the dataset that contributed most significantly to the anomalies.

Figure 5:
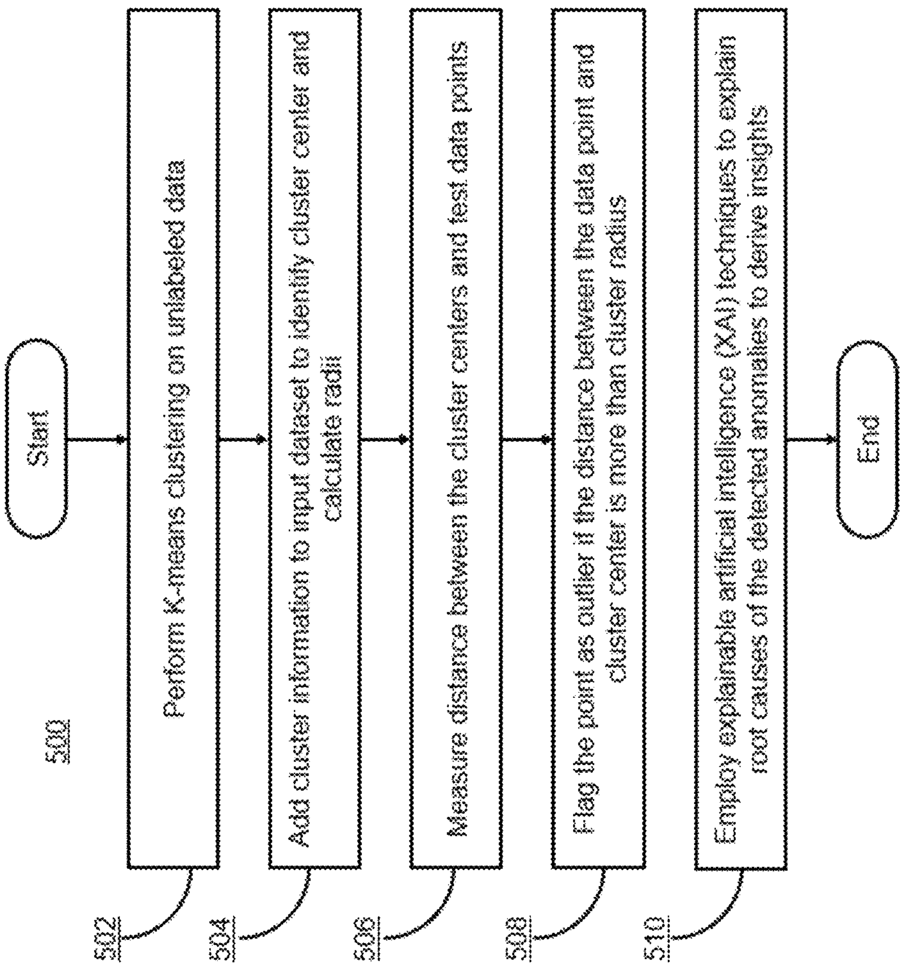
FIG. 5 is a diagram that illustrates a flow chart for a method for detecting anomalies in unlabeled data by employing unsupervised clustering technique, in accordance with an embodiment of the disclosure.

FIG. 5 is a diagram that illustrates a flow chart 500 for a method for detecting anomalies in unlabeled data by employing unsupervised clustering technique, in accordance with an embodiment of the disclosure.

In one or more embodiments, the anomaly detection module 214 employs an unsupervised approach using a clustering technique for detecting anomalies in the unlabeled data, which performs k-means clustering, adds the cluster information to the input dataset to identify cluster center and calculate radii for all clusters, and measures distance between the cluster centers and test data points thereby determining anomalous data points.

The clustering technique leverages k-means clustering to identify patterns in the data by grouping similar data points together into clusters, allowing the anomaly detection module 214 to detect points that significantly deviate from these clusters.

At 502, the anomaly detection module 214 initially processes the unlabeled dataset by performing k-means clustering, which involves partitioning the dataset into k clusters, where each cluster contains data points that are more similar to each other than to points in other clusters, and assigning each data point to the cluster whose center (also called the centroid) is closest to it, based on a predefined distance metric such as Euclidean distance.

The k-means clustering divides the data into k distinct groups, with each group representing a cluster of similar data points. These clusters are then used as the basis for identifying normal points and potential anomalies.

At 504, after performing k-means clustering, the anomaly detection module 214 identifies the cluster centers (or centroids) and calculates the radius for each cluster. The radius (r) of a cluster refers to the maximum distance between the cluster center (C) and any point within that cluster. This provides a measure of how spread out the data points are around the cluster center, helping to establish a boundary for normal data points within that cluster.

Cluster Center (C): This is the centroid of the cluster, representing the mean position of all data points in that cluster.

Cluster Radius (r): This is the maximum distance between the cluster center and any data point within the cluster. Each cluster has a different radius, depending on how tightly or loosely packed the points are around the center.

The anomaly detection module 214 then calculates the radius for each cluster, denoted as r1, r2, r3, . . . , for clusters C1, C2, C3, . . . , respectively.

Once the cluster centers and radii are identified, the anomaly detection module 214 assigns each data point in the original dataset a cluster number (indicating to which cluster the point belongs), as well as the cluster center and radius associated with that cluster. This information provides a reference for evaluating new, unseen data points.

At 506, when a new test data point arrives, the anomaly detection module 214 evaluates whether this point is an anomaly by comparing it to the pre-defined clusters, by measuring the distance between the new test data point and the centers of all clusters. This results in distance values d1, d2, d3, . . . , where:

d1 is the distance between the new test data point and cluster center C1, d2 is the distance between the new test data point and cluster center C2, and so on.

To determine if the new data point is an anomaly, the anomaly detection module 214 compares the distances (d1, d2, d3, . . . ) to the corresponding cluster radii (r1, r2, r3, . . . ), by applying a threshold multiplier (n). The multiplier can be adjusted (e.g., n=2, 3, etc.) to control the strictness of the anomaly detection process, wherein the new (test) data point is evaluated as:

For each cluster, the anomaly detection module 214 checks whether the distance between the test point and the cluster center exceeds the product of the cluster radius and the threshold multiplier, i.e., d1>n*r1, d2>n*r2, and so on.

If the test point's distance from all cluster centers exceeds the respective radius thresholds, the point is classified as an anomaly. Specifically, if for all clusters:

$$d1 > n*r1,$$

$$d2 > n*r2,$$

$$d3 > n*r3, \ldots$$

the test point is considered to be significantly distant from any established cluster, indicating it is an outlier.

At 508, the system 106 flags the point as an outlier if the distance between the data point and the cluster center is more than the cluster radius.

In one or more embodiments, clustering techniques like k-means are employed to group data points into clusters based on their proximity to a cluster center (centroid). By using the cluster radius as a boundary, the system 106 can efficiently flag data points that fall outside this normal range of variation, indicating them as potential anomalies.

At 510, the system 106, upon detecting the anomalies, employs XAI techniques to explain root causes of the detected anomalies and derive insights. By leveraging the XAI, the system 106 examines the features and patterns in the dataset that contributed most significantly to the anomalies.

Figure 6:
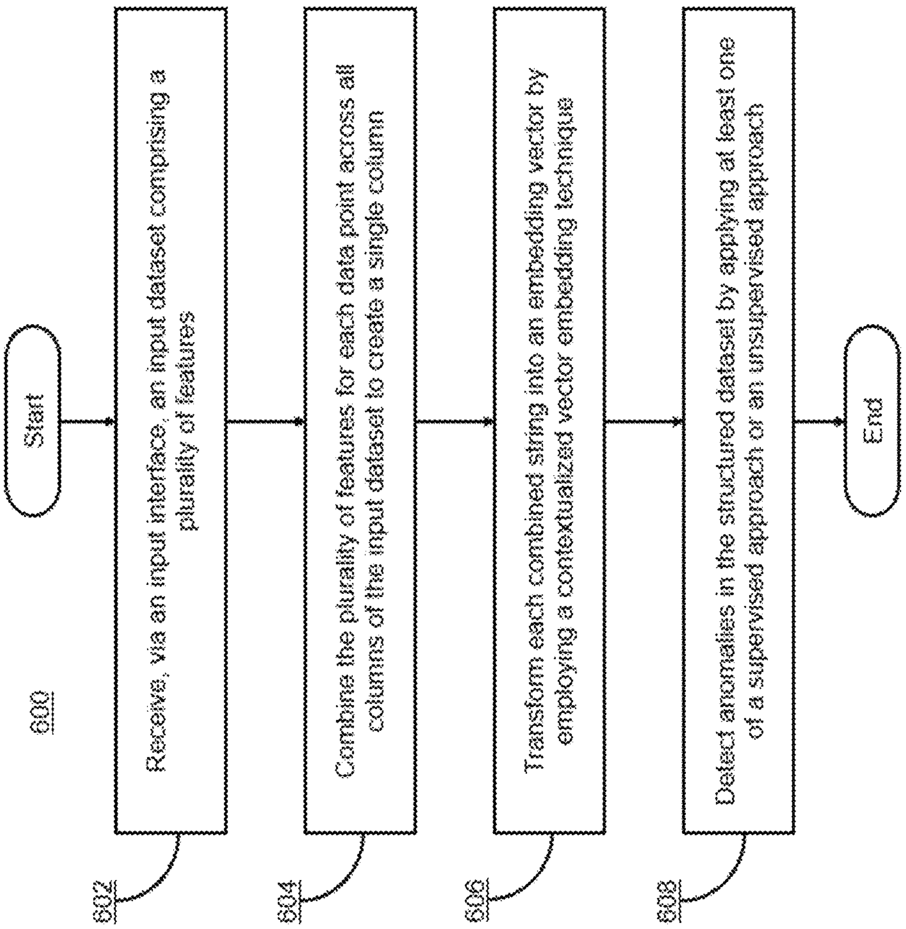
FIG. 6 is a diagram that illustrates a flow chart for a method for detecting anomalies in a structured dataset, in accordance with an embodiment of the disclosure.

FIG. 6 is a diagram that illustrates a flow chart 600 for a method for detecting anomalies in a structured dataset, in accordance with an embodiment of the disclosure.

At 602, an input dataset comprising a plurality of features is received via the input interface 208. The input interface 208 facilitates seamless interaction between a user and the anomaly detection processes. The input interface 208 is also configured to receive various types of input datasets, whether they are labeled or unlabeled, thereby ensuring versatility and usability across different applications.

In one or more embodiments, the plurality of features refer to the multiple attributes or characteristics that comprise the input dataset. Each feature represents a distinct variable that contributes to the overall dataset, capturing different dimensions of the data being analyzed.

The plurality of features received by the input interface 208 may correspond to each data point across all columns of the input dataset. Each feature of the plurality of features represents an individual attribute or variable of the data. In a tabular dataset, the plurality of features are represented as columns, and each row corresponds to a single data point or record. For instance, the input interface 208 captures all relevant data points (rows) for every feature (column) in the input dataset.

At 604, the plurality of features for each data point across all columns of the input dataset are combined to create a single column using a combining module 210, where each entry in the single column contains a combined string of the respective features.

In some non-limiting embodiments, the combining module 210 may initially access the input dataset and parse each data point. For each row in the dataset, it retrieves the feature values from multiple columns. The combining module 210 may then apply a combining operation to combine the feature values into a single string.

Thereafter, the combining module 210 places the resulting string in a new single column within the dataset. The process is repeated for each data point (or row) in the input dataset, thus creating a new column where each entry corresponds to the combined features of the data point.

At 606, each combined string is transformed into an embedding vector by employing a contextualized vector embedding technique wherein the embedding captures the interactions among the plurality of features in a vector space.

In one or more embodiments, the contextualized vector embedding technique refers to a method used to represent data points in a continuous, dense vector space where similar data points (in context) are located closer to each other. These embeddings typically capture more meaningful relationships between features. The transformation module 212 applies such a technique to convert the combined strings into vectors that represent the underlying data in a machine-learning-friendly format.

By considering the entire combined string, the transformation module 212 embeds the data in a way that reflects relationships between different features in the string. For example, a string like "30, Male, 50000" might result in a vector that places more emphasis on age and income in predicting purchasing behavior, while another string might emphasize different aspects depending on the combination of features.

In one or more embodiments, for each combined string in the single column, the transformation module 212 outputs an embedding vector, which is a numerical representation of the input string.

By employing the contextualized vector embeddings, the transformation module 212 considers the relationships and interactions between the plurality of features when generating the embeddings from respective data points.

Finally at 608, anomalies in the structured dataset are detected by applying at least one of a supervised approach or an unsupervised approach to the embedding vector in the vector space.

The input to the anomaly detection module 214 consists of embedding vectors. The embedding vectors represent data points in a dense, continuous space, where each vector encapsulates the relationships between the features of a data point. Since the embeddings are compact representations of the original dataset, the anomaly detection module 214 works on the vectorized version of the data to detect outliers or unusual patterns.

In one or more embodiments, the anomaly detection module 214 may employ either a supervised approach or an unsupervised approach to detect anomalies in the structured dataset.

In accordance with the one or more embodiments, when the input data received is determined to be the labelled data, the anomaly detection module 214 employs the supervised approach for detecting the anomalies. Alternatively, when the input data received is determined to be the unlabeled data, the anomaly detection module 214 employs the unsupervised approach for detecting the anomalies.

In one or more embodiments, the anomaly detection module 214 employs a supervised approach using a majority voting technique for detecting anomalies in the labelled data, which generates similar records based on a similarity score and assigns a target label to the new input dataset.

The anomaly detection module 214, by utilizing the majority voting technique, determines the classification of the new input data point (either normal or anomalous), and assigns a target label to the data point. The assigned label is based on the outcome of the majority vote, ensuring that the new data point is categorized in line with the existing patterns in the labeled data.

In one or more embodiments, the anomaly detection module 214 employs an unsupervised approach using a Local Outlier Factor (LOF) technique for detecting anomalies in the unlabeled data, which assesses reachability distance between data points, evaluates local reachability density of the data points, and calculates an outlier factor of the data points.

In one or more embodiments, with regards to assessing reachability distance between data points, the LOF technique begins by determining the reachability distance of each data point. The process starts with the identification of the k nearest neighbors, where k is a user-specified parameter that controls the size of the local neighborhood being analyzed. The anomaly detection module 214 calculates the distance between the target data point and each of its k nearest neighbors.

In one or more embodiments, with regards to evaluating local reachability density of the data points, the LOF technique calculated local reachability density of a data point based on its reachability distance. Specifically, by utilizing the LOF technique, the anomaly detection module 214 sums the distances between the target data point and each of its k nearest neighbors and then divides the sum by k. This calculation provides a measure of the local density surrounding the data point.

In one or more embodiments, with regards to calculating the outlier factor of a data point, the anomaly detection module 214 computes the outlier factor for each data point by utilizing the LOF technique. The outlier factor is a ratio that compares the local reachability density of the data point to the average local reachability density of its k nearest neighbors. If the data point has a low local reachability density (indicating it is in a sparsely populated region) compared to the higher densities of its neighbors, the outlier factor will be high, signaling that the data point is likely an outlier.

In one or more embodiments, the anomaly detection module 214 employs an unsupervised approach using a clustering technique for detecting anomalies in the unlabeled data, which a) performs k-means clustering, b) adds the cluster information to the input dataset to identify cluster center and calculate radii for all clusters, and c) measures distance between the cluster centers and test data points thereby determining anomalous data points.

The clustering technique leverages k-means clustering to identify patterns in the data by grouping similar data points together into clusters, allowing the anomaly detection module 214 to detect points that significantly deviate from these clusters.

In one or more embodiments, the system 106, upon detecting the anomalies, employs XAI techniques to explain root causes of the detected anomalies and derive insights. By leveraging the XAI, the system 106 examines the features and patterns in the dataset that contributed most significantly to the anomalies.

The disclosure disclosed herein is advantageous over existing art in that it employs contextual embedding analysis to detect anomalous objects in both labelled and unlabeled data in vector space representation. This dual capability, combined with the use of contextual embeddings, enhances the precision and flexibility of anomaly detection across diverse datasets.

In addition, improved accuracy is a significant advantage of using contextualized embedding-based anomaly detection, particularly due to the method of searching for similarities based on cosine distance in a vector space. Unlike traditional machine learning solutions that often rely on more simplistic feature representations, contextualized embeddings capture the rich semantics of the data.

Another advantage of the disclosure is that by utilizing contextualized embeddings for anomaly detection, the disclosure eliminates the need for separate feature selection and feature engineering processes. With contextualized embeddings, all features are transformed into a single, unified representation regardless of the dataset.

This inherent capability to consolidate information means that significant columns are automatically captured without needing explicit identification or selection. As a result, the risk of overlooking critical features is minimized, and the potential biases introduced by manual selection are avoided.

An important advantage of using contextualized embedding model that is pretrained is the elimination of the feature selection process, which often adds complexity and time to model development. By bypassing this step, the present disclosure significantly reduces inference time, which is crucial for real-time anomaly detection algorithms. This streamlined approach enhances performance and ensures timely responses, making it ideal for applications where speed and accuracy are paramount.

By representing the data in vector space, the disclosure efficiently analyzes high-dimensional datasets where traditional methods might struggle. The vector space representation enables the system to identify anomalies based on proximity in the high-dimensional space, and capture complex, multi-feature relationships that might be overlooked by simpler detection techniques.

Another significant advantage of the disclosure is that by leveraging the contextualized vector embedding technique, a substantial improvement in anomaly detection over traditional methods is provided. In this approach, similarity searches are conducted within the vector space or database, utilizing embedding vectors that encapsulate not only the feature values but also their contextual relationships. Unlike classical machine learning techniques, which rely on fixed or predefined feature representations, contextualized embeddings dynamically capture the interactions between features in a high-dimensional space.

This enriched representation of the input data leads to significantly improved accuracy in anomaly detection. By storing contextual information within the embedding vectors, the disclosed system gains the ability to discern subtle and complex patterns, which classical techniques often fail to recognize.

In this approach, anomalies can be identified with greater precision, as the anomalous detection system evaluates the degree of similarity between data points in a high-dimensional space. Cosine similarity effectively measures the angle between vectors, which remains robust even in scenarios where feature magnitudes vary, leading to a more reliable distinction between normal and anomalous instances.

The disclosure disclosed herein provides significant advantage over existing solutions in that it contextualizes each data point within its broader environment, allowing the detection even subtle anomalies, reduces false positives by recognizing that some seemingly unusual data points are actually normal when considered within the full context of the dataset, minimizes false negatives by detecting anomalies that may not be obvious in isolation but become clear in the vector space due to their deviation from normal patterns.

Additionally, the disclosure is advantageous in that it eliminates the need for converting categorical columns into numerical ones, which is often a cumbersome and time-consuming process in traditional machine learning model construction. Instead, all categorical features are seamlessly transformed into a single string and subsequently represented as a unified embedding vector. This innovation simplifies the preprocessing phase, allowing for a more streamlined and efficient model-building process, ultimately enhancing productivity and reducing potential errors associated with manual conversions.

Additionally, the disclosure is advantageous in that it leverages contextual embedding on the input data that is based on Large Language Model (LLM), which captures the feature interactions in optimized way. By leveraging the optimized approach, the disclosure can enhance the accuracy and relevance of the data processing, facilitating improved decision-making.

Further, the disclosure is advantageous in that it captures the full spectrum of feature interactions, preserving the richness and diversity of the input data. The approach minimizes the probability of information loss, as every feature contributes to the representation in the embedding space. By maintaining the integrity of all the available information, the system can better understand complex relationships and detect subtle anomalies that might otherwise go unnoticed.

Furthermore, a significant advantage of the disclosure is that, by utilizing XAI, it can elucidate the decision-making process behind anomaly detection, providing users with insights into which specific features contributed to the identification of an outlier.

By incorporating XAI techniques, the disclosure not only enhances its reliability but also strengthens the overall user experience, making it a more attractive and trustworthy option for organizations looking to implement anomaly detection in their operations.

Those skilled in the art will realize that the above-recognized advantages and other advantages described herein are merely exemplary and are not meant to be a complete rendering of all of the advantages of the various embodiments of the present disclosure.

In the foregoing complete specification, specific embodiments of the present disclosure have been described. However, one of ordinary skill in the art appreciates that various modifications and changes can be made without departing from the scope of the present disclosure. Accordingly, the specification and figures are to be regarded in an illustrative rather than a restrictive sense. All such modifications are intended to be included within the scope of the present disclosure.

What is claimed is:

1. A system for detecting anomalies in a structured dataset, the system comprising:

- a memory comprising computer readable instructions; and
- a processor communicatively coupled with the memory, wherein the processor is configured to:
  - receive, via an input interface, an input dataset comprising a plurality of features;
  - combine the plurality of features for each data point across all columns of the input dataset to create a single column, wherein each entry in the single column contains a combined string of features corresponding to a data point;
  - transform the combined string of each entry into an embedding vector by employing a contextualized vector embedding technique, wherein the embedding vector captures interactions among the plurality of features in a vector space; and
  - detect the anomalies in the structured dataset by applying at least one of a supervised approach or an unsupervised approach to the embedding vector in the vector space.

2. The system of claim 1, wherein the input dataset comprises at least one of labelled data or unlabeled data.

3. The system of claim 2, wherein the detecting anomalies in the labelled data of the input dataset comprises employing the supervised approach using a Majority Voting Technique, wherein the Majority Voting Technique generates similar records based on a similarity score and assigns a target label to a new input dataset.

4. The system of claim 2, wherein the detecting anomalies in the unlabeled data of the input dataset comprises employing the unsupervised approach using a Local Outlier Factor (LOF) technique.

5. The system of claim 4, wherein the detecting anomalies using the LOF technique comprises:

- assessing a reachability distance between data points;
- evaluating a local reachability density of the data points; and
- calculating an outlier factor for the data points.

6. The system of claim 2, wherein the detecting anomalies in the unlabeled data of the input dataset comprises employing an unsupervised clustering technique.

7. The system of claim 6, wherein the unsupervised clustering technique comprises:

- performing K-means clustering to generate clusters;
- adding cluster information to the input dataset to identify cluster centers and calculate a radius for each of the clusters; and
- determining anomalous data points by measuring distances between the cluster centers and input data points.

8. The system of claim 1, wherein the processor is further configured to explain root causes of the anomalies detected in the structured dataset and derive insights by employing explainable Artificial Intelligence (XAI) techniques.

9. The system of claim 1, wherein the processor is further configured to generate synthetic data in a case where inadequate data patterns are detected in the input dataset.

10. A method for detecting anomalies in a structured dataset, the method comprising:

- receiving, via an input interface, an input dataset comprising a plurality of features;
- combining the plurality of features for each data point across all columns of the input dataset to create a single column, wherein each entry in the single column contains a combined string of features corresponding to a data point;
- transforming the combined string of each entry into an embedding vector by employing a contextualized vector embedding technique, wherein the embedding vector captures interactions among the plurality of features in a vector space; and
- detecting the anomalies in the structured dataset by applying at least one of a supervised approach or an unsupervised approach to the embedding vector in the vector space.

11. The method of claim 10, wherein the input dataset comprises at least one of labelled data or unlabeled data.

12. The method of claim 11, wherein the detecting anomalies in the labelled data of the input dataset comprises employing the supervised approach using a Majority Voting Technique, wherein the Majority Voting Technique generates similar records based on a similarity score and assigns a target label to a new input dataset.

13. The method of claim 11, wherein the detecting anomalies in the unlabeled data of the input dataset comprises employing the unsupervised approach using a Local Outlier Factor (LOF) technique.

14. The method of claim 13, wherein the detecting anomalies using the LOF technique comprises:

assessing a reachability distance between data points;

evaluating a local reachability density of the data points; and calculating an outlier factor for the data points.

15. The method of claim 11, wherein the detecting anomalies in the unlabeled data of the input dataset comprises employing an unsupervised clustering technique.

16. The method of claim 15, wherein the unsupervised clustering technique comprises:

performing K-means clustering to generate clusters;

adding cluster information to the input dataset to identify cluster centers and calculate a radius for each of the clusters; and determining anomalous data points by measuring distances between the cluster centers and input data points.

17. The method of claim 10 further comprising explaining root causes of the anomalies detected in the structured dataset and deriving insights by employing explainable Artificial Intelligence (XAI) techniques.

18. The method of claim 10 further comprising generating synthetic data in a case where inadequate data patterns are detected in the input dataset.

* * * * *